(12) United States Patent
    Fradet et al.

(10) Patent No.: US 10,068,111 B2
(45) Date of Patent: Sep. 4, 2018

(54) METHOD AND SYSTEM FOR MARKING MANUFACTURED ITEMS TO DETECT UNAUTHORIZED REFILLING

(71) Applicant: INEXTO SA, Lausanne (CH)

(72) Inventors: Erwan Pierre Marie Fradet, Grandvaux (CH); Patrick Chanez, Cheyres (CH); Philippe Chatelain, Chavornay (CH)

(73) Assignee: INEXTO SA, Lausanne (CH)

( * ) Notice: Subject to any disclaimer, the term of this patent is extended or adjusted under 35 U.S.C. 154(b) by 0 days.

(21) Appl. No.: 15/317,517

(22) PCT Filed: Jun. 19, 2015

(86) PCT No.: PCT/EP2015/063839
§ 371 (c)(1),
(2) Date: Dec. 9, 2016

(87) PCT Pub. No.: WO2015/197494
PCT Pub. Date: Dec. 30, 2015

(65) Prior Publication Data
US 2017/0109549 A1    Apr. 20, 2017

(30) Foreign Application Priority Data
Jun. 23, 2014   (EP) ..................................... 14173470

(51) Int. Cl.
*G06K 19/06*   (2006.01)
*G06K 1/12*    (2006.01)
(Continued)

(52) U.S. Cl.
CPC ......... *G06K 1/121* (2013.01); *G06K 7/10861* (2013.01); *G06K 19/06009* (2013.01); *H04L 9/0618* (2013.01); *H04L 9/0861* (2013.01)

(58) Field of Classification Search
CPC ... G06K 19/06037; G06K 7/14; G06K 7/1417
(Continued)

(56) References Cited

U.S. PATENT DOCUMENTS

| 5,646,389 A | 7/1997 | Bravman |
| 6,547,137 B1 | 4/2003 | Begelfer |

(Continued)

FOREIGN PATENT DOCUMENTS

| EP | 1 645 992 | 4/2006 |
| WO | WO 2010/063909 | 6/2010 |

OTHER PUBLICATIONS

PCT Search Report and Written Opinion for PCT/EP2015/063839 dated Sep. 7, 2015 (11 pages).
(Continued)

*Primary Examiner* — Ahshik Kim
(74) *Attorney, Agent, or Firm* — Mueting, Raasch & Gebhardt, P.A.

(57) ABSTRACT

A method for marking a manufactured item is provided, the manufactured item comprising a container and a removable closure for the container, the method comprising: generating a first code for the container, generating a second code for the closure, marking the container with the first code, and marking the closure with the second code, wherein the first code and the second code are interrelated such that at least a portion of one of the first code and the second code can be derived from the other of the first code and the second code. In an authentication process one of the first or second codes or a portion of the first or second code, in encrypted or unencrypted form, may be compared with a value derived from reading the other of the first or second code.

20 Claims, 3 Drawing Sheets

(51) Int. Cl.
  *H04L 9/06* (2006.01)
  *H04L 9/08* (2006.01)
  *G06K 7/10* (2006.01)

(58) Field of Classification Search
  USPC .............................. 235/494, 462.01, 462.09
  See application file for complete search history.

(56) References Cited

U.S. PATENT DOCUMENTS

| | | |
|---|---|---|
| 2005/0288938 A1 | 12/2005 | Date |
| 2007/0203808 A1 | 8/2007 | Sekimoto |
| 2008/0046263 A1 | 2/2008 | Sager |
| 2009/0230190 A1 | 9/2009 | Chanez |
| 2012/0228388 A1* | 9/2012 | Kuo ................. G06K 19/07771 235/492 |
| 2012/0254052 A1* | 10/2012 | Gao ..................... G06Q 30/018 705/318 |
| 2012/0310848 A1* | 12/2012 | Gao ..................... G06Q 30/018 705/317 |
| 2014/0046852 A1 | 2/2014 | Chatelain |
| 2015/0310386 A1 | 10/2015 | Fradet |
| 2015/0317644 A1 | 11/2015 | Chanez |
| 2015/0332210 A1 | 11/2015 | Niquille |
| 2016/0027021 A1* | 1/2016 | Kerdemelidis ...... G06Q 30/018 705/317 |
| 2016/0307153 A1 | 10/2016 | Loken |

OTHER PUBLICATIONS

Bernardi, P. et al., "An Anti-Counterfeit Mechanism for the Application Layer in Low-Cost RFID Devices", *Circuits and Systems for Communications*, 2008, ECCSC 2008, 4th European Conference ON, IEEE, Piscataway, N.J. USA, Jul. 10, 2008, pp. 227-231, XP031315029.

* cited by examiner

METHOD AND SYSTEM FOR MARKING MANUFACTURED ITEMS TO DETECT UNAUTHORIZED REFILLING This application is a U.S. National Stage Application of International Application No. PCT/EP2015/063839, filed Jun. 19, 2015, which was published in English on Dec. 30, 2015, as International Publication No. WO 2015/197494 A1. International Application No. PCT/EP2015/063839 claims priority to European Application No. 14173470.7 filed Jun. 23, 2014.

The present invention relates to a method and apparatus for marking a manufactured item comprising a container and a closure for the container. In particular, the invention addresses the problem of detecting the re-filling of containers with counterfeit products.

Counterfeiting is the process of fraudulently manufacturing, altering, or distributing a product that is of lesser value than the genuine product. Anything that can be made can be counterfeited. Counterfeit goods include not only clothing, jewellery, purses, CDs, and DVDs, but also baby formula, medications, cigarettes, electronic equipment and parts, airplane and automobile parts, and toys. Although some believe counterfeiting is a victimless crime, it has many far-reaching consequences. To begin with, depending upon the nature of the product being counterfeited, there can be serious health and safety concerns for consumers, such as in the examples of counterfeit baby formula, toys for children, medications, car parts, or electronic goods. In nearly every instance, counterfeited goods are not made with the same quality materials or to the same high standards as the original.

In addition, counterfeiting damages brand owners' reputations and lowers consumer confidence in the affected brands. Counterfeiting also damages brand owners and retailers selling legitimate products by causing missed sales opportunities and actual job losses by manufacturers and retailers. Consumer confidence and the value of branding may suffer when purchasers discover that the product they bought, believing that it was being sold under a recognized brand, is in fact not authentic. The damages does not stop with brand owners and consumers because counterfeiting also deprives national economies of customs duties and tax revenues.

One specific industry in which counterfeiting is a problem is the wine industry. A number of solutions exist to deal with counterfeiting in the wine industry. One approach is to use a method that analyses the contents of the wine bottle or other container using spectrometry or frequency swept electric fields. However these approaches are expensive and are not appropriate for all types of closures and products as they can cause damage. Another approach is to use special labels or banderoles on the bottle and/or closure. However this does not solve the problem of the bottles being used and thereafter re-filled with counterfeit product.

As well as counterfeiting, the re-filling of containers can also be used as a means of evading tax. The refilling of already-used containers can also pose a health risk because the counterfeit products could be of inferior quality to authentic goods.

The same problems exist in other industries, such as the pharmaceutical industry.

There is therefore a need to provide a method and apparatus for marking manufactured items comprising containers and associated closures, such as wine bottles, that allows the items to be authenticated, and that allows for detection of containers that have been re-filled in an unauthorised manner.

In a first aspect of the invention, there is provided a method for marking a manufactured item, the manufactured item comprising a container and a removable closure for the container, the method comprising:
 generating a first code for the container;
 generating a second code for the closure;
 marking the container with the first code; and
 marking the closure with the second code,
 wherein the first code and the second code are different but interrelated such that at least a portion of one of the first code and the second code can be derived from the other of the first code and the second code.

The first code and second code may be generated from the same item specific identifier using different code generation processes, or using different encryption keys in an identical code generation process.

A portion of the first or second code may be derived by performing a cryptographic process on the other of the first or second code. The cryptographic process may comprise a cryptographic hashing, key hashing, symmetric encryption, asymmetric encryption or any combination of these processes. Alternatively, or in addition, the cryptographic process may comprise combining the other of the first or second code with secret information. The secret information may be derived from at least a portion of the first or second code.

The first or second code, or both the first and second code, may encode production details for the manufactured item. The production details may uniquely identify the manufactured item from within a batch of manufactured items.

At least a portion of one of the first code and the second code may be derived by looking up data associated with the other of the first and second codes in an electronic database.

One or both of the first and second codes may be positioned such that a portion of the code is on the container and another portion of the code is on the closure. The code is then destroyed when the closure is removed from the container.

The method may be carried out in a production line in which a plurality of containers are filled and closed with a closure. The method may comprise marking the containers with a first marking means and marking the closures with a second marking means. The method may comprise monitoring the containers through the production line and controlling the first and second marking means to ensure that the corresponding first and second codes are applied to the same manufactured item. In other words, the first and second marking means may be controlled to ensure that the first and second codes on each final manufactured item correspond to each other. The closure may be marked by the second marking means before or after the closure is placed on the container.

Unauthorised refills are detected as replicating the two interdependent codes can be made logistically impossible for refillers. A method in accordance with the invention allows for direct and online serialization of containers during the first filling process. And it can be easily incorporated into existing tracking and tracing systems configured to allow the tracking of product batches through a supply chain (for regulatory compliance, product recalls etc.). It is a very low cost solution, as it does not require any special hardware or the printing or application of special labels, such as banderoles. A method in accordance with the present invention can be implemented using standard industry printing and vision systems, making it affordable for small to medium-sized manufacturers.

The method of the present invention also offers substantial material savings and environmental benefits compared with some alternative solutions. With the method of the present invention there is no need to produce, ship, process, and reconcile banderoles, which means that paper use is reduced, and the environmentally damaging chemical ingredients that are used in security inks are not needed.

At least one of the first and second codes may be a human readable code. At least one of the first and second codes may be a machine readable code.

The container may comprise a bottle and the closure may comprise a cap.

In a second aspect of the invention, there is provided a method of authenticating a manufactured item comprising a container and a removable closure for the container, the manufactured item marked in accordance with any one of the preceding claims, comprising:

reading one of the first code and the second code and at least a portion of the other of the first code and the second code, deriving a portion of the other of the first code and the second code from the one of the first code and the second code;

comparing the derived portion of the other of the first code and the second code with the read portion of the other of the first code and the second code; and providing an indication that the manufactured item is authentic if the derived portion of the other of the first code and the second code is identical to the read portion of the other of the first code and the second code.

In a third aspect of the invention, there is provided an apparatus for marking a manufactured item, the manufactured item comprising a container and a removable closure for the container, the apparatus comprising:

one or more computer processors for generating a first code for the container and a second code for the closure; and at least one marker configured to mark the container with the first code and the closure with the second code;

wherein the one or more computer processors are configured or programmed to generate the first code and the second code so that the first code and the second code are different but interrelated such that at least a portion of one of the first code and the second code can be derived from the other of the first code and the second code.

The apparatus may form part of a production line in which a plurality of containers are filled and closed with a closure to form manufactured items. The apparatus may comprise a first marking means for marking the containers and a second marking means for marking the closures. The apparatus may further comprise a controller and one or more sensors configured to monitor the containers through the production line and control the first and second marking means to ensure that the corresponding first and second codes are applied to the same manufactured item.

The container may comprise a bottle and the closure may comprise a cap.

The first or second code may be placed on the closure or container such that it is destroyed during removal of the closure from the container.

In a fourth aspect of the invention there is provided a manufactured item comprising a container and a closure, wherein the container is marked with first code and the closure is marked with a second code, wherein the first code and the second code are different but interrelated such that at least a portion of one of the first code and the second code can be derived from the other of the first code and the second code.

The container may comprise a bottle and the closure may comprise a cap.

The first or second code may be placed on the closure or container such that it must be destroyed during removal of the closure from the container.

Features described in relation to one aspect of the invention may be applied to other aspects of the invention. In particular, the one or more computer processors of the third aspect of the invention may be configured or programmed to generate first and second codes in accordance with the first aspect of the invention Embodiments of the invention will now be described, by way of example only, with reference to the accompanying drawings, in which.

Figure 1:
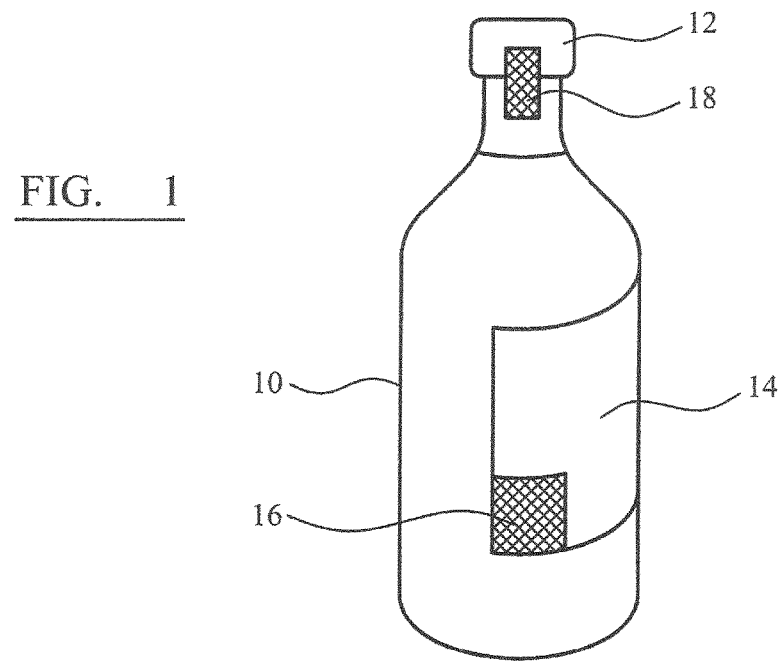
FIG. 1 is a schematic illustration of a container and closure marked in accordance with the invention.

FIG. 1 illustrates a container 10 for a product such a medicine or an alcoholic beverage. The container 10 is a bottle with an open neck that is closed by a closure 12. A first label 14 is adhered to the container 14 and includes a first code 16. The first code has a machine readable portion and a human readable portion encoding the same information. A second code 18 is printed on a cover sealing the closure 12. The second code is a machine readable code, derived from or related to the first code 16. In order to remove the closure, the cover must be broken, which then renders the second code unreadable.

Figure 2:
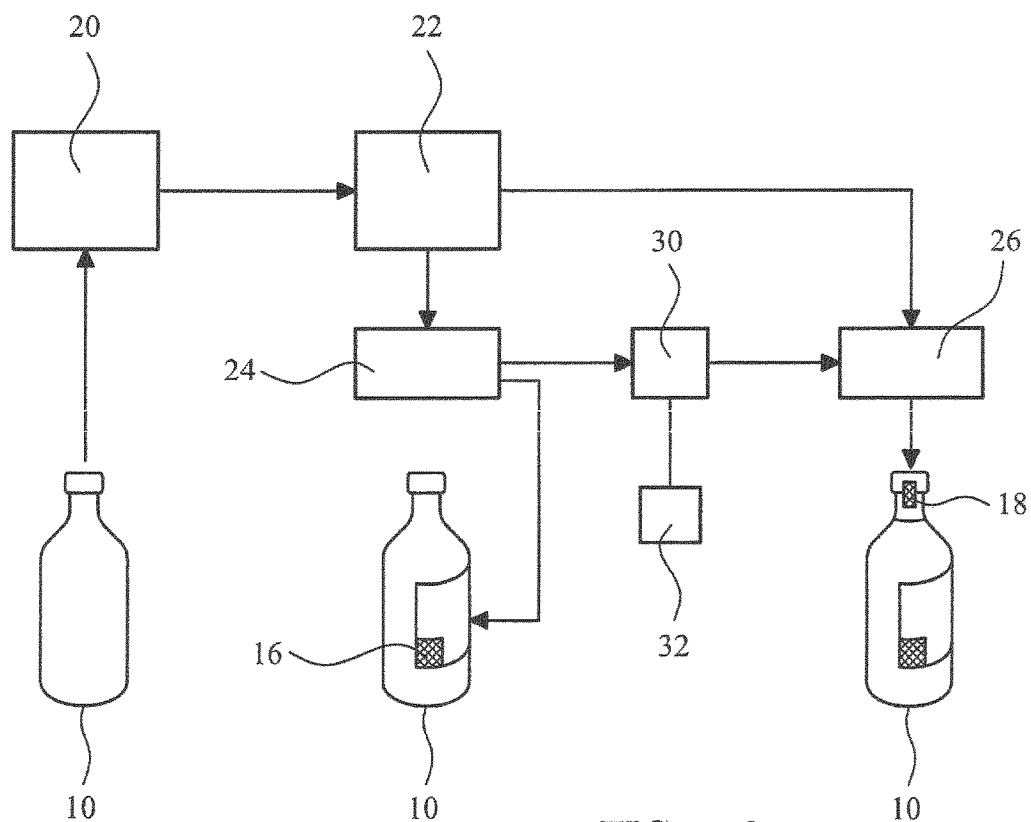
FIG. 2 is a schematic illustration of a marking system in accordance with the invention.

FIG. 2 is a schematic illustration of a system for marking a container of the type illustrated in FIG. 1 within a production centre. The bottle 10 is filled and a unique product identifier for the bottle is generated at processor 20. The unique product identifier may include production details for the product in the bottle. The production details may comprise the time of production, details of the product, a batch number and details of the production or filling line. The UPI is sent to a code generator 22, which generates a first code using the UPI and secret information known to the producer. The first code may be generated using any suitable technique and some examples are described below.

The first code is sent to a marker, in this case a printer 24, and printed onto a label 14 which is applied to the bottle 10. The code generator 22 generates a second code using the UPI and different secret information known only to the manufacturer. The second code 18 is applied to the closure 12 by marker 26.

As an alternative, the first code, or a portion of the first code, may be subsequently read by reader device, such as an optical scanner, and then decoded. A second code generator then uses the read and decoded first code to generate the second code 16. The second code generator may perform a hash function on a portion of the first code or may generate the second code in another manner, examples of which are described below.

In order to ensure that corresponding first and second codes are applied to the same final manufactured item, a control unit 30, together with one or more sensors 32 are used to track the containers and closures within the production centre. The control unit controls printer 26 to ensure that the correct code is applied to each closure.

To enable tracking and tracing operations, the UPI or other information may be stored locally or remotely from the production centre.

To verify that a container is authentic and has not been re-filled, a verifier can reconstruct the second code (or information derivable from the second code) from the first code and compare the reconstructed second code with a read second code. If they are not identical, the closure and container do not match and it can deduced that the container has been refilled. In addition, the first code or the second code, or both, can be checked to determine if they are genuine codes by comparing them or portions of them with data held by the producer or sent to a verification centre by the producer.

In this embodiment, the second code is derived directly from the UPI rather than the first code, however, the first and second codes may alternatively be interrelated in another ways. For example, the second code may be generated directly from the first code. Alternatively the second code may be derived from the same UPI and additional information, but using a different encryption technique or with an additional encryption process. Any interrelationship may be used that allows a verifier to derive the second code from the first code.

In this embodiment the first and second codes are marked onto the container and closure. The first code is printed onto an adhesive label and the second code is printed on a closure seal, such as a foil on the neck of a bottle. However, any suitable marking means may be used, for example but not limited to, a continuous ink jet printer, a drop-on-demand ink jet printer, a holographic printer, a laser printer, or any other printer or marker that allows printing or marking of the generated codes on the individual containers and closures. The printing or marking of the generated codes may be directly on each item, on labels or in any other convenient way. In one embodiment, the generated codes are printed by a laser beam on a layer of laser-sensitive material deposited on the container or closure. This method allows a code to be impressed through a transparent wrapping layer.

Figure 3:
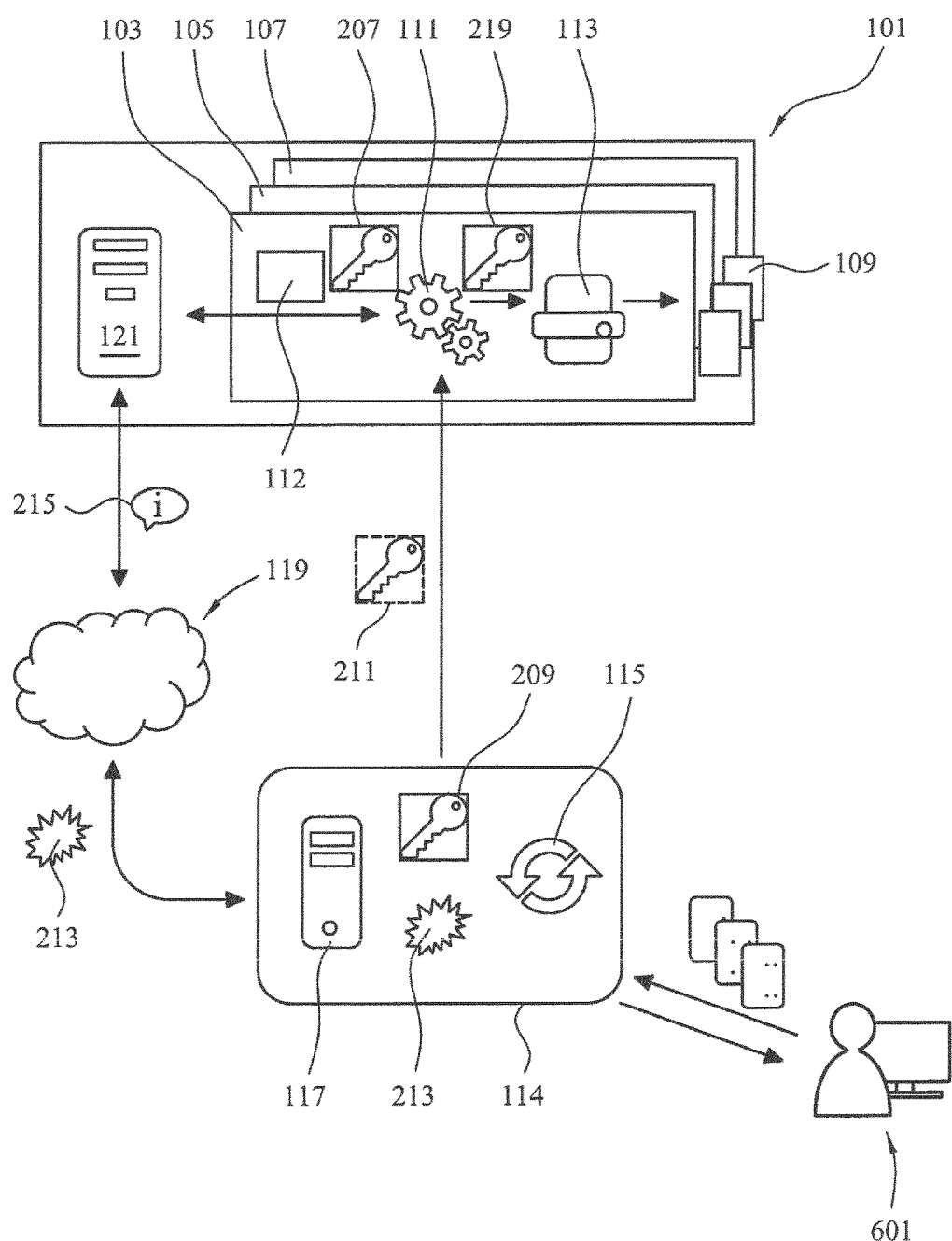
FIG. 3 is a schematic illustration of a marking and authentication system in accordance with the invention.

FIG. 3 is a schematic view of a system according to one embodiment of the invention. In this embodiment, system 101 comprises one or more production centres 103, 105, 107 for producing filled containers 109. Preferably, production is carried out in batches, each batch being dedicated to the production of a certain number of individual filled containers. If there are two or more production centres, these may be physically located at the same or different manufacturing sites. In this preferred embodiment, the system includes production centres 103, 105, 107, but the invention may in fact be performed at an importation point, a distribution point, a purchaser, a wholesaler or any other point in the supply chain.

Each production centre includes a code generator 111 for generating codes for the manufactured items 109, as described with reference to FIG. 2. Preferably, the code generators 111 are fully autonomous computers or microcontrollers dedicated to a particular production centre.

The system 101 further comprises a verification centre 114 which includes a key generator 115 for generating keys 209, 211 for use in the marking and authenticating of filled containers and a central server 117. In this embodiment, the code generators 111 can communicate with the verification centre 114 via a secure internet connection 119 and a server 121 local to the production centre, or by other data communication means. Alternatively, the code generators 111 might communicate with the verification centre via a manufacturing portal dedicated to one or more production centres.

The key generator 115 generates a cryptographic key, herein referred to as a static key. The key generator 115 generates an unencrypted version of the static key and an encrypted version of the static key. The unencrypted version of the static key, herein referred to as the active static key 209, is shown with a solid border in FIG. 3. The encrypted version of the static key, herein referred to as the inactive static key 211, is shown with a dotted border in FIG. 3. The active static key 209, that is to say the unencrypted version of the static key, is generated in the key generator 115 and is therefore accessible to the central server 117. The key generator 115 sends the inactive static key 211 to the code generators 111 at the production centre 103, 105, 107.

The inactive static key 211 may be sent from the key generator 115 to the code generators 111 on a non-volatile data support, for example a CD-Rom, a DVD-Rom or a removable hard disk. The data support is physically transferred to the code generator 111 at the production centre 103, 105, 107. Alternatively, the inactive static key 211 may be sent from the key generator 115 to the code generator 111 via a secure network connection, for example one involving encryption. This may be on request from the code generator 111. This ensures authenticity, confidentiality and integrity of the static key.

The key generator 115 also generates the activation code 213, which comprises the key or code for decrypting the inactive static key 211 to form the active static key 209. This activation code 213 is also accessible to the central server 117. Preferably, the active static key 209 and activation code 213 are stored together with identification of the production centre 103, 105, 107 to which they are allocated.

In one embodiment, the static key comprises a number of portions. The primary portion may be a plurality of secret codes, for example a salt matrix. A salt matrix may be, for example, a long string of random or pseudorandom digits of characters. The number of portions may further include a unique identifier for the static key, a serialized code defining how the static key is to be combined with a dynamic key (discussed below), a digital cryptographic certificate associated the static key's unique identifier and a static key policy or license that contains the digital cryptographic certificate generated above.

Preferably, the inactive static key, that is to say the encrypted version of the static key, and particularly the plurality of secret codes, is encrypted using a strong cipher. An example of a suitable cipher is the Triple DES (Data Encryption Standard) block cipher or the Triple DES/Rijandel block cipher. Both apply the Data Encryption Standard cipher algorithm three times to each data block and the Triple DES/Rijandel is a minor variation of the Triple DES which has been developed by IBM. In that case, the Triple DES or Triple Des/Rijandel key comprises the activation code 213. Thus, in a preferred embodiment, the active static key 209 is unencrypted, the inactive key 211 is encrypted using the Triple DES or Triple Des/Rijandel key, and the activation code 213 comprises that Triple DES or Triple Des/Rijandel key.

The inactive static key 211 received by the code generator 111 is registered. This is done by the code generator 111 sending to the verification centre 114 information 215 about the received static key and any relevant machine information (not shown). This is preferably sent via secure internet connection 119, as shown in FIG. 3, but may be sent by another suitable route. The verification centre 114 sends back to the code generator 111 the activation code 213. The activation code 213 allows the inactive static key 211 to be activated, and this is shown schematically at 217. The activation code 213 is preferably also sent via secure internet connection 119, as shown in FIG. 3. The registration procedure is preferably arranged such that the active static key 209 is never transferred over the internet.

The registration procedure may take the form of a conventional public/private key exchange mechanism. This may use an asymmetric key pair associated with the digital cryptographic certificate forming part of the static key, as discussed above. In that case, the public key of the asymmetric key pair may be in the form of a key issued by a third party, for example, a government authority. The information 215 about the received static key which is sent from the code generator 111 to the verification centre 114 may comprise the unique identifier for the static key which forms part of the static key, as discussed above. The relevant machine information (not shown) which is also sent from the code generator 111 to the verification centre 114 may comprise a unique identifier or certificate for the code generator 111 or production centre. That unique identifier may include information about the location and identity of the code generator or production centre, which has been pre-authorized for production. Preferably, the static key unique identifier and the code generator or production centre identifier are encrypted using the public key of the asymmetric key pair associated with the certificate of the static key.

Once the verification centre 114 receives the encrypted static key unique identifier and the code generator or production centre identifier, the verification centre 114 can decrypt using the private key of the asymmetric key pair associated with the certificate of the static key. The verification centre may then check that the static key unique identifier and the code generator or production centre identifier are valid. Then, the verification centre 114 sends back to the code generator 111 the activation code 213. As already mentioned, preferably, the activation code 213 is in the form of a Triple DES or Triple DES/Rijandel cipher. The verification centre encrypts the activation code (for example the Triple DES or Triple DES/Rijandel cipher) with the public key of the asymmetric key pair associated with the certificate of the static key. This allows the activation code (for example the Triple DES or Triple DES/Rijandel cipher) to be decrypted by the code generator using the private key of the asymmetric key pair associated with the certificate of the static key. Then, the inactive static key 211 can be activated using the decrypted activation code 213 in order to form the active static key 209.

Once the inactive static key 211 at the code generator 111 has been activated, the production centre is able to produce codes for the containers and closures at the code generator 111.

The code generator 111 generates a new key, herein referred to as dynamic key 219, for each batch of containers. The dynamic key 219 is preferably a random secret code, such as a random number. The code generator uses the dynamic key 219 for a batch, together with the active static key 209, to generate a secret key 223. The secret key 223 is then used in combination with the unique product identifier (UPI) for each item to generate codes 221 (for example alpha-numeric codes) to be marked onto the manufactured items in that batch. In this embodiment, the UPI for each item comprises production details identifying the time of production together with an incremental counter value to distinguish items produced within a single time period by the same production centre.

The code generator uses a cryptographic hash function on a combination of the UPI with the secret key. This creates a digital fingerprint, referred to herein as a "noise value", for the container or closure, and these noise values are used to generate the codes 221 that are marked on the containers and closures. In addition to commonly used cryptographic hash functions, a variety of techniques are available for generating the hash values or noise values, including, but not limited to: transposition, substitution, table substitution and indexing.

To generate the container noise value, the secret key is first derived from the active static key, the dynamic key for the container and the UPI. The dynamic key 219 and the active static key 209 are known only to the verification centre 114 and the code generator 111. The dynamic key and the UPI are used to extract the secret key from the salt matrix contained in the static key, in accordance with the serialized code within the static key. The secret key 223 and UPI 221 are then hashed to produce the container noise value. The same process, with a different dynamic key, is followed for the closure. The hash function used to generate the container noise value may be the same or different to the hash function used to generate the closure noise value.

To generate the first code which is placed on the container, the container noise value and the UPI are combined and then encrypted by a code generator obfuscation key (CGOK) 231 to produce a first identifier. The CGOK is particular to the code generator and is pre-loaded onto the code generator. The first identifier may then be combined with a code generator identifier. The code generator identifier (CGID) allows the CGOK to be obtained during authentication. The combination of the first identifier, and the CGID is then encrypted using a global key to produce the first code 16. The global key 235 is common to all production centres, and may be part of a symmetric or asymmetric key pair known by the verification centre. The first code is then marked on the container using marker 113.

To generate the second code which is placed on the container, the closure noise value and the UPI are combined and then encrypted by a code generator obfuscation key (CGOK) 231 to produce a second identifier. The CGOK is particular to the code generator and is pre-loaded onto the code generator. The second identifier is then combined with the CGID. The combination of the second identifier, and the CGID is then encrypted using the global key to produce the second code 16. The second code is then marked on the container The code generator 111 or production centre 103, 105, 107 keeps a count of the codes which are marked onto the containers and/or the closures. In addition, the code generator 111 sends the dynamic key 219 for each batch, together with information about the batch (not shown), to the verification centre 114. This may be performed via secure internet connection 119. The information about the batch may include various pieces of information, for example but not limited to brand, intended market or intended destination. The dynamic keys 219 do not need to be sent to the verification centre 114 in real-time and can be communicated to the verification centre at any appropriate time, for example monthly. The dynamic keys 219 sent to the verification centre 114 are stored in a database (for example at central server 117) at or accessible from the verification centre 114. The dynamic key 219 for each batch is preferably stored together with the batch information sent to the verification centre 114 at the same time.

Preferably, the active static key 209 is deleted when the code generator 111 at a particular production centre 103, 105, 107 is put out of service. This prevents a malicious user from gaining access to the active static key 209 without proper registration. Additional means for disabling the code generator 111 and preventing unauthorized use of the code generator 111 and production centre may be provided.

In the embodiment described, the codes for the container and corresponding closure are based on the same UPI but use different dynamic keys. There are many alternative methods to generate first and second codes based on the same UPI. For example, the second code may be generated using the same dynamic key as the first code but using a different hash function or a different obfuscation technique. Alternatively, the second code may be based on the same UPI and the same or different secret key as the first code, but may be generated using an entirely different encryption process. Alternatively the second code may be generated directly from the first code, using a further encryption or obfuscation step. Alternatively, the second code may correspond to the first identifier, i.e. the second code may be a version of the first code that has undergone fewer encryption stages.

Figure 4:
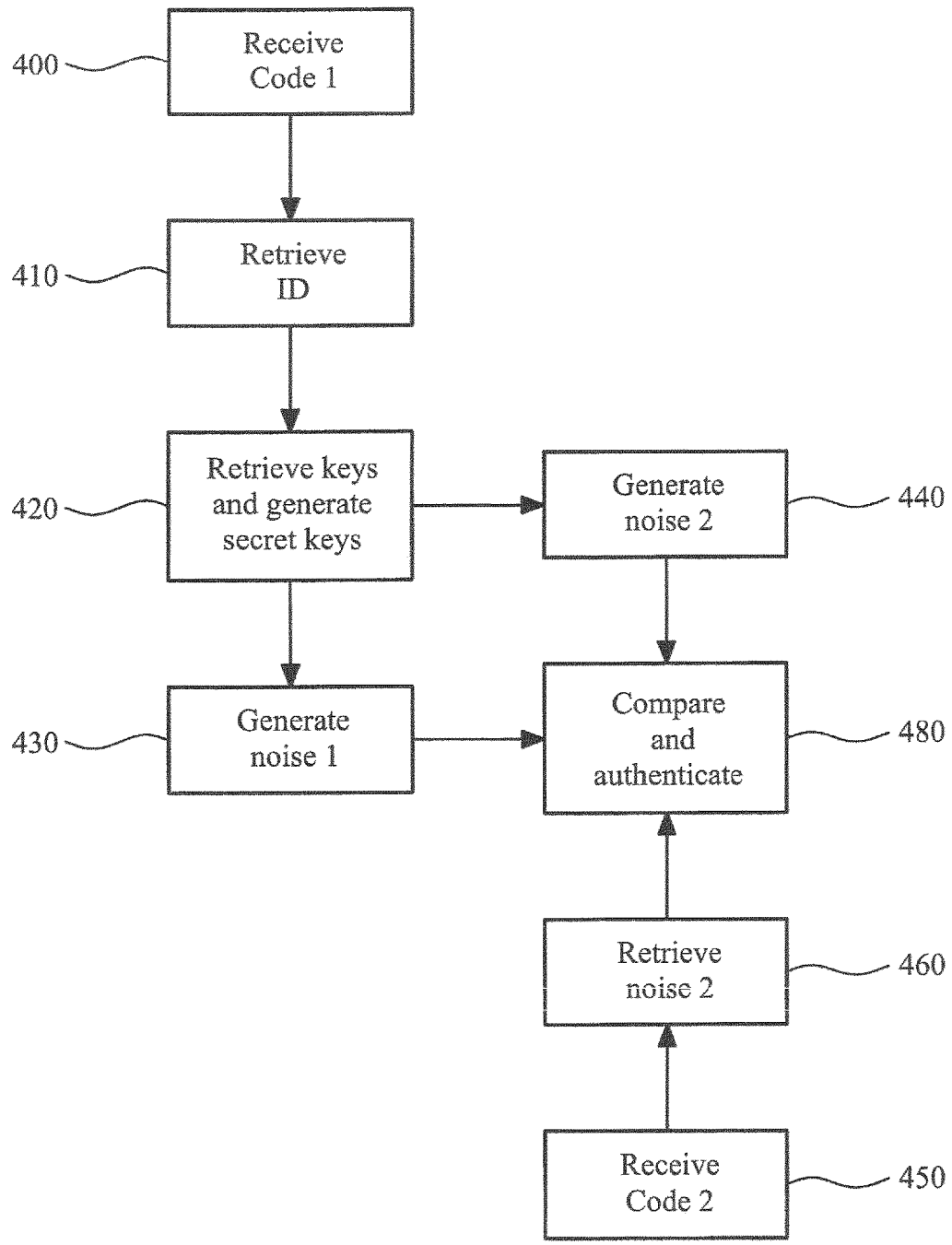
FIG. 4 is a flow diagram illustrating an authentication process in accordance with the invention.

FIG. 4 is a flow diagram of an authentication process in accordance with the invention. In step 400 the first code is read from the container by a user 601 (shown in FIG. 3) and sends it to the verification centre 114. The user 601 may send the code to the verification centre 114 by any suitable means such as a secure or non-secure internet connection.

The verification centre receives the first code. The first code is decrypted using the global key (or the corresponding key in the key pair if asymmetric keys are used) in step 410 to reveal the first identifier. The CGID is also revealed. Using a look-up table, the CGOK is then obtained from the CGID. The first ID is then decrypted using the CGOK to reveal the first noise and the UPI. In step 420 the active static key 209 and dynamic key 219 for both the container and for the closure are retrieved based on the UPI. The first noise can be recreated in step 430 and the second noise recreated in step 440. To authenticate the item the recreated first noise can be compared with the first noise retrieved from the read first code in step 480. Additionally, to detect unauthorised refilling, the second noise recreated from the read first code can be compared with a read value of the second noise. In step 450 the verification receives from the user a read value for the second code. The second noise is then retrieved from the read value of the second noise using the global, key and the CGOK. If the value of the second noise obtained from reading the second code matches the value of the second noise generated from the first code, then the container and closure can be considered to match and no refilling occurred.

It is of course possible to use different authentication processes and the process used depends on the marking process that has been used.

As used herein, "encryption" means the process of transforming information using an algorithm to make that information unreadable to anyone except those possessing special knowledge in the form of an encryption key. Decryption is the reverse process. An "encryption key" is a piece of information that is used together with an encryption algorithm to encrypt or decrypt information. An encryption key is typically a numerical or alphanumerical sequence or value.

As used herein, the term "secret key" is used to describe a key used in a keyed hash that is generated using a unique product identifier and one or more additional keys or pieces of data. At the time it is generated, the secret key is not known by any other party than the party who created the secret key. The term "secret key" in this context is not limited to mean a private key in the context of an asymmetric encryption scheme.

As used herein, a "hash function" is a function that maps input data to a fixed size output (usually smaller than the input data) called a hash value. A hash function typically substitutes or transposes, or substitutes and transposes, the information to create the hash value or noise value. Preferably, the hash function is a cryptographic hash function. The cryptographic hash function produces a fingerprint or checksum of the input data. Two pieces of data can be assumed to be identical if using the same cryptographic hash function they produce the same hash value. Advantageously, the hash function is a one-way hash function, which means that it is computationally impossible to derive the input data from the hash value. These properties can be used in an authentication process, as will be described. A hash function can be keyed by combining a secret key and an input message in order to create a keyed hash value or noise.

As used herein the term "noise value" means a hash value, or a keyed hash value, or a value or character sequence derived directly from a hash value and a secret key.

The invention claimed is:

1. An apparatus for marking a manufactured item, the manufactured item comprising a container and a removable closure for the container, the apparatus comprising:
   one or more computer processors for generating a first code for the container and a second code for the closure;
   at least one marker configured to mark the container with the first code and the closure with the second code;
   wherein the first code and the second code are different but interrelated such that at least a portion of one of the first code and the second code can be derived from the other of the first code and the second code, and wherein at least a portion of the first or second code is derived by performing a cryptographic process on the other of the first or second code.

2. An apparatus according to claim 1, wherein the cryptographic process comprises combining the other of the first or second code with secret information.

3. An apparatus according to claim 1, wherein either the first or second code, or both the first and second code, encode production details for the manufactured item.

4. An apparatus according to claim 1, wherein the apparatus forms part of a production line in which a plurality of containers are filled and closed with a closure to form manufactured items and comprises a first marking means for marking the containers and a second marking means for marking the closures, a controller and one or more sensors configured to monitor the containers through the production line and to control the first and second marking means to ensure that the corresponding first and second codes are applied to the same manufactured item.

5. A method for marking a manufactured item, the manufactured item comprising a container and a removable closure for the container, the method comprising:
   generating a first code for the container;
   generating a second code for the closure;
   marking the container with the first code; and
   marking the closure with the second code, wherein the first code and the second code are different but interrelated such that at least a portion of one of the first code and the second code can be derived from the other of the first code and the second code, and wherein at least a portion of the first or second code is derived by performing a cryptographic process on the other of the first or second code.

6. A method according to claim 5, wherein the cryptographic process comprises cryptographic hashing, key hashing, symmetric encryption, asymmetric encryption or any combination of these processes.

7. A method according to claim 5, wherein the cryptographic process comprises combining the other of the first or second code with secret information.

8. A method according to claim 7, wherein the secret information is derived from at least a portion of the first or second code.

9. A method according to claim 5, wherein either the first or second code, or both the first and second code, encode production details for the manufactured item.

10. A method according to claim 9, wherein the production details uniquely identify the manufactured item from within a batch of manufactured items.

11. A method according to claim 5, wherein the container comprises a bottle and the closure comprises a cap.

12. A method according to claim 5, the method further comprising:
reading one of the first code and the second code and at least a portion of the other of the first code and the second code,
deriving a portion of the other of the first code and the second code from the one of the first code and the second code;
comparing the derived portion of the other of the first code and the second code with the read portion of the other of the first code and the second code; and
providing an indication that the manufactured item is authentic if the derived portion of the other of the first code and the second code is identical to the read portion of the other of the first code and the second code.

13. A manufactured item comprising a container and a closure, wherein the container is marked with first code and the closure is marked with a second code, wherein the first code and the second code are different but interrelated such that at least a portion of one of the first code and the second code can be derived from the other of the first code and the second code, and wherein at least a portion of the first or second code is derived by performing a cryptographic process on the other of the first or second code.

14. A manufactured item according to claim 13, wherein the container comprises a bottle and the closure comprises a cap.

15. A manufactured item according to claim 13, wherein the first or second code is placed on the closure or container such that it must be destroyed during removal of the closure from the container.

16. A manufactured item according to claim 13, wherein the cryptographic process comprises combining the other of the first or second code with secret information.

17. A manufactured item according to claim 13, wherein either the first or second code, or both the first and second code, encode production details for the manufactured item.

18. A method of authenticating a manufactured item comprising a container and a removable closure for the container, the method comprising:
generating a first code for the container;
generating a second code for the closure;
marking the container with the first code;
marking the closure with the second code,
wherein at least a portion of the first or second code is derived by performing a cryptographic process on the other of the first or second code process such that at least a portion of one of the first code and the second code can be derived from the other of the first code and the second code;
reading one of the first code and the second code and at least a portion of the other of the first code and the second code,
deriving a portion of the other of the first code and the second code from the one of the first code and the second code;
comparing the derived portion of the other of the first code and the second code with the read portion of the other of the first code and the second code; and
providing an indication that the manufactured item is authentic if the derived portion of the other of the first code and the second code is identical to the read portion of the other of the first code and the second code.

19. A method according to claim 18, wherein the cryptographic process comprises combining the other of the first or second code with secret information.

20. A method according to claim 18, wherein either the first or second code, or both the first and second code, encode production details for the manufactured item.

* * * * *